INVENTORS
DONALD M. BARRUS
ARDELL C. WILLIAMS

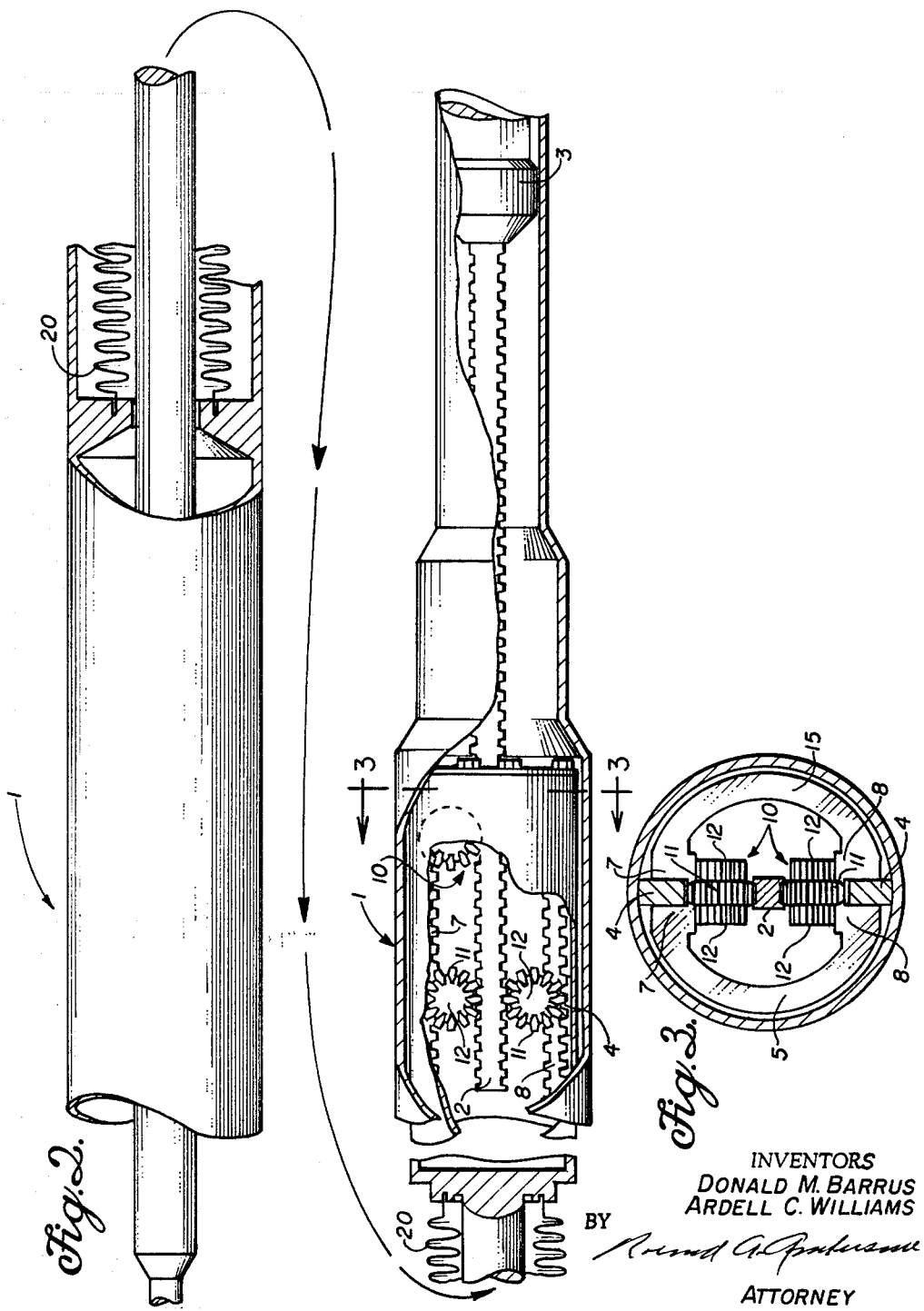

United States Patent Office 3,405,032
Patented Oct. 8, 1968

3,405,032
REACTOR CONTROL BY FREE PINION RACK AND PINION LINEAR ACTUATOR MOTION MULTIPLIER
Donald M. Barrus, Canoga Park, and Ardell C. Williams, Chatsworth, Calif., assignors, by mesne assignments, to the United States of America as represented by the United States Atomic Energy Commission
Filed July 26, 1967, Ser. No. 656,639
6 Claims. (Cl. 176—36)

ABSTRACT OF THE DISCLOSURE

The invention describes a mechanism in which floating pinions operate between a system of fixed and movable racks to provide motion multiplication which is highly advantageous for systems such as control rod drives. The pinions are triple gears having two small gears integrally mounted on each side of a larger gear. Four such pinions are used in the basic mechanism; however, any number may be used. Two fixed racks are mounted in opposition within a housing. One movable output rack is provided in the center of the housing with teeth on both sides; the large gears are in contact with the fixed racks and the output rack. Four movable input racks are mounted in pairs facing each other in a fork frame in contact with the smaller gears to impart rotary motion thereto. Motion of the input rack is multiplied at the output rack in relation to the pitch diameter ratios of the pinions.

Background of the invention

The invention relates to a motion multiplier, and more particularly relates to a geared multiplier which does not require bearings and is particularly adaptable to high temperature and nuclear applications. This invention arose under or in the course of Contract AT(11-1)–GEN–8 with the U.S. Atomic Energy Commission.

In the nuclear reactor, high temperature and similar arts, numerous problems have been presented which require unique solutions. Some of these problems are fairly obvious in contrast with the solution of these problems. For example, conventional bearings would not survive being subjected to very high temperature, liquid metal or radioactivity applications.

In the nuclear reactor control rod art, the rods are quite long, and it is desirable that the actuating mechanism be as short as possible for several reasons in addition to economy.

Summary of invention

Accordingly, it is an object to provide a motion multiplier especially adapted for nuclear reactor and high temperature application.

In accordance with this invention, there is provided a combination of fixed and movable racks with a group of floating pinions which require neither shafts nor bearings in a manner which results in motion of an output rack greater than the motion of an input rack.

The above-identified and further objects and advantages of the invention will be clear upon reading the following complete specification of a preferred embodiment.

Description of drawings

FIGURE 2 is a cutaway side elevation view of a control rod drive.
FIGURE 3 is an end view along lines 3—3 of FIGURE 2.

Description of preferred embodiment

Figure 1:
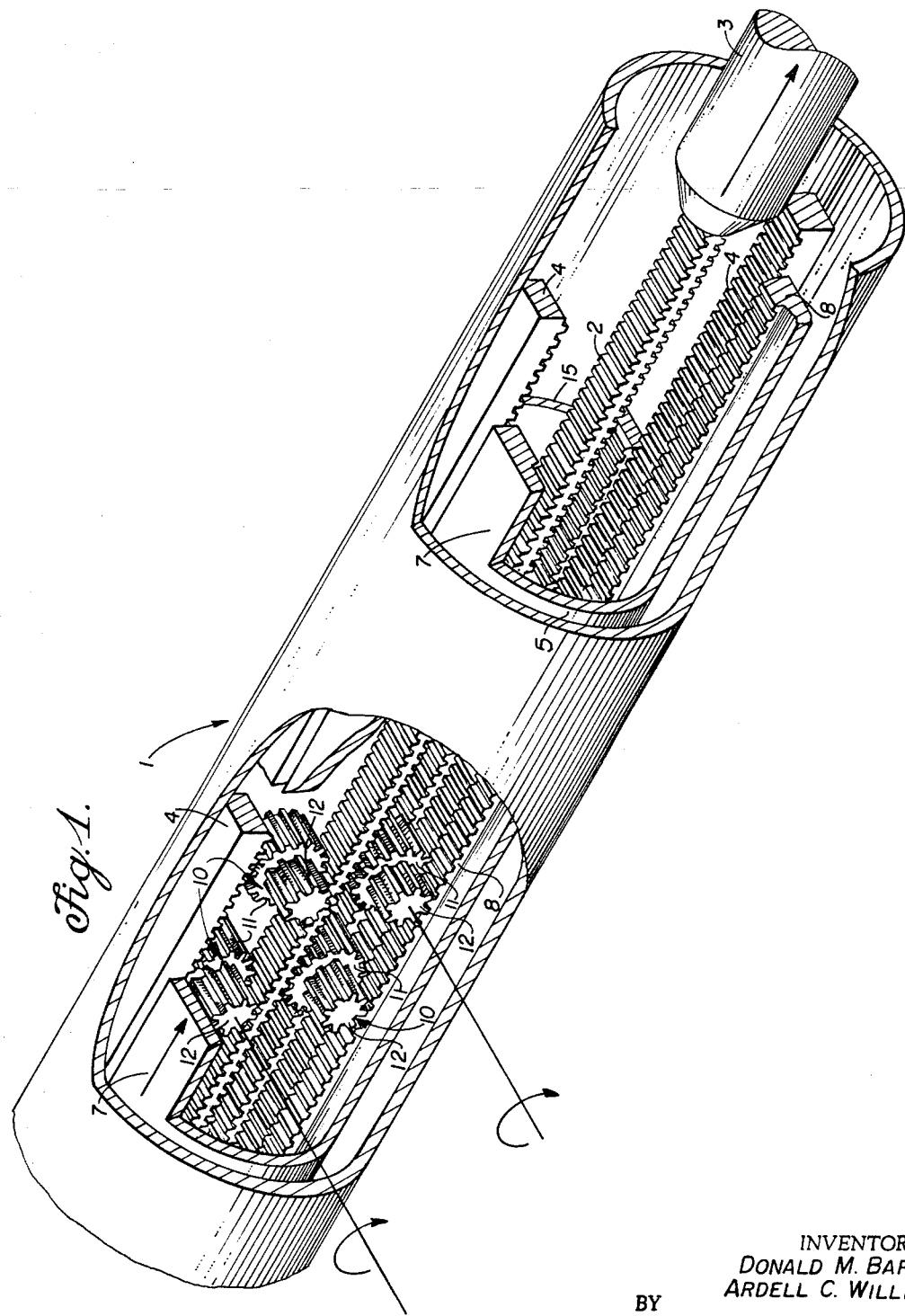
FIGURE 1 is a cutaway projection of the rack and pinion motion multiplier.

In FIGURE 1, there is shown a casing or housing 1 within which is a movable output rack 2 mounted centrally located in the casing for linear reciprocating motion. The load end 3 of the output rack is preferably the control rod of a nuclear reactor.

A pair of fixed racks 4 are mounted at diametrically opposite positions on the inner circumference of the casing and integral therewith with the geared surfaces facing each other.

A pair of control members are shown as 5 and 15. Each control member includes a yoke 7 integrally connecting two racks 7 and 8 as a single movable unit. The control members ride freely within the casing being guided by the pinions and/or other guidance means if desired.

Four sets of pinion gear means are shown as 10. Each set of pinion gears includes two small gears 12, one on each side of a large gear 11, in a single piece of construction with the noticeable absence of any shaft or bearings.

The pinions ride freely between the movable output rack 2 and the fixed racks 4 and movable input racks 5 and 15. The use of four sets of pinions eliminates any need for further guidance or control of the racks.

It should be noted that the large gears 11 ride between the output rack 2 and the fixed rack 4. The smaller gears 12 are in contact only with the movable racks 7 and 8 of the control members 5 and 15. For example, movable rack 8 is in contact with two small gears, movable rack 7 is in contact with another two small gears on one side of the large gears. Similarly, while control member 15 is only partially shown in FIGURE 1, it is understood that it is the same as control member 5, and its movable racks are in contact solely with the small gears on the opposite side of the large gears.

The operation of the pinion and rack multiplier will now be described. When the control members 5 and 15 are moved to the right, the pinions roll to the right along the fixed rack 4, while also moving the output member 2 to the right.

Essentially what has been done is that movement of the control member 5 exerts a moment of inertia at the point of contact with the small gear. This moment of inertia is transferred to the large gear and the difference in diameter of the gears results in multiplication of the motion at the output member; the pinions have become class 3 levers. Where the pitch diameter ratio of the larger gear to the smaller gear is 2 to 1, the multiplication in movement is 4 to 1.

In FIGURE 2, there is shown a nuclear reactor control rod drive mechanism using the gear multiplier of FIGURE 1. The control rod is shown as 3 and the racks and pinions are shown with the same numerals as in FIGURE 1. A bellows 20 is shown as a seal for the shaft that actuates the yokes of the two movable control racks 5 and 15. In FIGURE 2, the bellows is shown in its extended position and the control rod is inserted within the reactor. When the bellows is retracted to the left, the control rod 3 and the entire movable rack systems 2, 5 and 15 and all of the pinions move to the left to withdraw the rod.

FIGURE 3 is an end view taken along lines 3—3 in FIGURE 2 to clearly show the relationship of the fixed and movable racks and pinions, using the same numerals as in FIGURES 1 and 2.

In summary, this invention provides a system for linear motion using gears without shaft and bearing, such that the system is usable at high temperature and in a corrosive atmosphere, while permitting very long movements with relatively small apparatus and short stroke through a seal. The bellows serves both as a force transmitting means and as a seal to separate the reactor core system from the control section.

While one embodiment of the invention has been described, it will be obvious that the invention has numerous uses and the embodiment shown is capable of being modified. Accordingly, the scope of this invention is defined in the following claims.

We claim:

1. In a nuclear reactor having a control rod and means for actuating the control rod, the improvement comprising:
   (a) a first movable rack for moving said control rod,
   (b) a fixed rack,
   (c) a second movable geared rack coupled to said actuating means, and
   (d) means including pinion gear means interposed between and mechanically coupling said fixed rack and both said movable racks for multiplying the motion of said second movable rack at said control rod.

2. Apparatus as in claim 1, further including a casing for enclosing said racks and gears, and wherein said pinion gear means includes a plurality of pinion gears coupled to said racks for preventing transverse movement of the racks within the casing, while permitting longitudinal movement of racks and pinions.

3. Apparatus as in claim 1, wherein said pinion gear means includes a plurality of triple gears, each including a large gear and two small gears integrally mounted on each side of the large gear.

4. Apparatus as in claim 3, wherein each of said large gears mechanically engages said fixed rack and said first movable rack, and wherein said small gears mechanically engage only said second movable rack.

5. In a nuclear reactor having a control rod and means for actuating the control rod, the improvement comprising:
   (a) a casing,
   (b) a first movable rack for moving said control rod, said first movable rack being positioned and extending along the axis of said casing,
   (c) two fixed racks positioned and extending along the inner circumference of the casing and at diametrically opposite positions therein,
   (d) a second movable rack means mechanically coupled to said actuating means, said second movable rack including at least two geared racks joined to form a unitary member,
   (e) a plurality of pinion gear means positioned between said fixed and both said movable racks for maintaining the axial position of said first movable rod and the relative position of both the fixed and movable rack while preventing transverse movement within the casing.
   (f) each of said pinion gears including a triple gear having a large gear with at least one small gear integrally mounted on one side thereof,
   (g) said large gear being mechanically coupled between said first movable rack and said fixed rack,
   (h) said small gear being mechanically coupled solely to said second movable rack, whereby when said second movable rack is displaced by said actuating means, both movable racks and the pinion gears are physically displaced in the same direction with the first movable rack and the control rod being displaced a larger distance than the movement of the second movable rack in direct dependence upon the difference in diameter of the larger and small gears.

6. Apparatus as in claim 5, wherein said actuating means includes a bellows for sealing the casing and the apparatus therein, thereby separating the reactor atmosphere.

References Cited

UNITED STATES PATENTS

| | | | |
|---|---|---|---|
| 2,283,746 | 5/1942 | Lohs | 74—422 |
| 3,038,845 | 6/1962 | Johnson et al. | 176—36 |

OTHER REFERENCES

"Ingenious Mechanisms for Designers and Inventors," vol. 1, 1948, pp. 257–259.

CARL D. QUARFORTH, *Primary Examiner.*

H. E. BEHREND, *Assistant Examiner.*